United States Patent Office 3,598,833
Patented Aug. 10, 1971

3,598,833
2-CYCLOALKYLAMINO-OXAZOLINES
Rudolf Hiltmann and Hartmund Wollweber, Wuppertal-Elberfeld, Kurt Stoepel, Wuppertal-Vohwinkel, and Walter Puls, Wuppertal-Elberfeld, Germany, assignors to Farbenfabriken Bayer Aktiengesellschaft, Leverkusen, Germany
No Drawing. Filed Sept. 22, 1967, Ser. No. 669,691
Claims priority, application Germany, Sept. 27, 1966, F 50,296
Int. Cl. C07d 85/36
U.S. Cl. 260—307     30 Claims

ABSTRACT OF THE DISCLOSURE 2-cycloalkylamino-oxazolines of the formula:

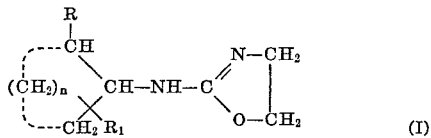

wherein R is lower alkyl of 1 to 3 carbon atoms, $R_1$ is hydrogen or at least one lower alkyl of 1 to 5 carbon atoms and $n$ is an integer from 2 to 4, and wherein the cycloalkyl moiety may contain a double bond provided that, if there is a double bond, such is not in the $\alpha,\beta$-position, are prepared by reacting 2-cycloalkylisocyanide dichlorides of the formula:

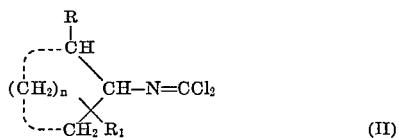

wherein R, $R_1$ and $n$ are as above defined, and in which the cycloalkyl moiety may contain a double bond, with the proviso that if there is a double bond, such is not in the $\alpha,\beta$-position, with ethanolamine in organic solvents or in water and, if desired, with the addition of a base or they may be prepared by cyclizing reactive esters of N-cycloalkyl-N'-$\beta$-hydroxyethyl-ureas of the formula:

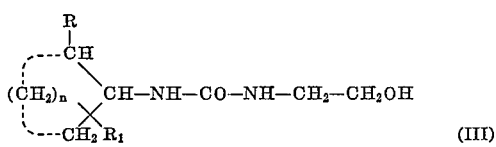

wherein R, $R_1$ and $n$ have the above defined meanings and in which the cycloalkyl moiety may contain a double bond, with the proviso that if there is a double bond, such is not in the $\alpha,\beta$-position, by heating in hot water optionally at temperatures above 100° C. under pressure and precipitating the bases by means of ammonia or alkali from the resultant aqueous solution of the 2-cycloalkylamino-oxazoline salts formed. When $R_1$ is hydrogen, the hydrogen atom is attached to a carbon atom so that in all cases each carbon atom maintains the proper valence. R and $R_1$ may be all cis, all trans, or some may be cis and the remaining trans. The amino group attached to the carbon atom in the 1-position in the cycloalkyl ring can also be cis or trans. The 2-cycloalkylamino-oxazolines are useful as local anesthetics, sedatives, vaso-constrictors, blood pressure depressants and they also exhibit an inhibitory effect on the secretion of gastric fluid thereby making them valuable for treating hypertonia and ulcers. By virtue of their blood sugar increasing effect, these compounds can also be used in humans and animals in the treatment of diseases whereby increase in blood sugar is desirable. These compounds are administered in the same dosage range and by the same routes of administration as compounds already known to have the above specified effects and properties.

The asymmetrical 2-cycloalkylamino-oxazolines of the present invention exist in racemic form and as is known such racemates can be resolved into their optical isomers.

The present invention is concerned with 2-cycloalkylamino-oxazolines of the formula:

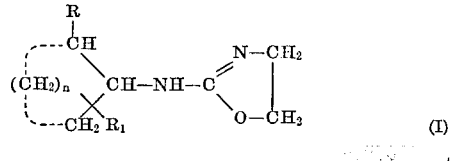

wherein:

R is lower alkyl of 1 to 3 carbon atoms,
$R_1$ is hydrogen or at least one lower alkyl of 1 to 5 carbon atoms, and
$n$ is an integer from 2 to 4, and in which the cycloalkyl moiety may contain a double bond, with the proviso that if there is a double bond, such is not in the $\alpha,\beta$-position.

When $R_1$ is hydrogen, the hydrogen atom is attached to a carbon atom so that in all cases each carbon atom maintains the proper valence. $R_1$ is preferably one or two lower alkyl moieties.

It is known in the art that 2-amino-oxazolines have local anesthetic properties, sedative properties and vaso-constrictory effects and have been known for use in de-swelling the mucous membrane. The 2-cycloalkylamino-oxazolines (I) in addition to having these properties also exhibit a strong blood pressure depressant effect and an inhibitory effect on the secretion of gastric fluid. These compounds are therefore useful for treating hypertonia and ulcers and are also useful for treating human and veterinary diseases where an increase in blood sugar is desired. The 2-cycloalkylamino-oxazolines (I) are to be administered in the same dosage range as the compounds already known to possess the above listed properties and may be administered by the same routes of administration.

The 2-cycloalkylamino-oxazolines of the formula:

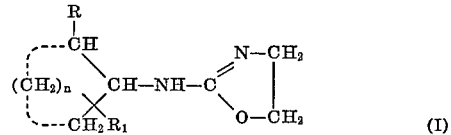

are prepared by reacting 2-cycloalkyl-isocyanide dichlorides of the formula:

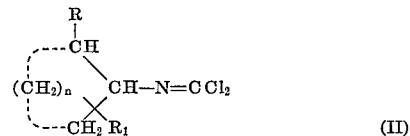

with ethanolamine in organic solvents or in water, and if desired, with the addition of a base such as triethylamine, sodium carbonate or sodium hydroxide at a temperature of from 0° C. to 100° C. or alternatively by cyclizing reactive esters of N-cycloalkyl 1-N' - $\beta$-hydroxyethyl-ureas of the formula:

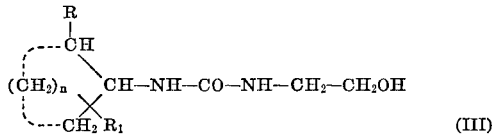

by heating in water, optionally at temperatures above

100° C. under pressure and precipitating the bases by means of ammonia from the resultant aqueous solution of the 2-cycloalkylamino-oxazoline salts formed. R, $R_1$ and $n$ have the meanings set forth above. The cycloalkyl moiety may contain a double bond, with the proviso that if there is a double bond, such is not in the $\alpha,\beta$-position.

If desired the salts so obtained can be converted into the free bases by means of a base such as a sodium hydroxide solution or ammonia.

The reactive esters of the N-cycloalkyl-N'-$\beta$-hydroxyethyl-ureas preferably comprise esters with hydrohalic acids and with alkyl-or aryl-sulphonic acids. These esters can be prepared by methods known per se, for example, by reacting $\beta$-haloethyl-isocyanates with cycloalkylamines of the formula:

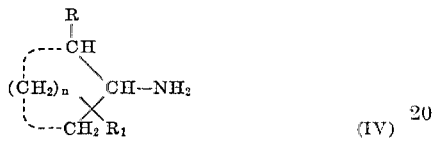

(IV)

wherein R, $R_1$ and $n$ are as above defined.

It is also possible to react cycloalkyl-isocyanates of the formula:

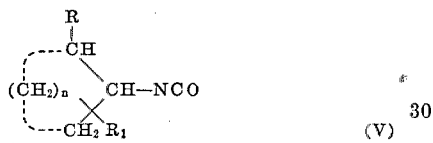

(V)

with ethanolamine and convert the resultant N-cycloalkyl-N'-$\beta$-hydroxyethyl-ureas into the reactive esters mentioned above. With this method it is not necessary to isolate the individual intermediates. It is possible, for example, by successive reaction of an appropriately substituted cycloalkyl-isocyanate with ethanolamine and thionyl chloride and subsequent boiling of the reaction product in an aqueous solution, to obtain the corresponding 2-cycloalkylamino-oxazoline. The compounds (I) wherein the cycloalkyl group is substituted by further alkyl moieties and/or contains a double bond, are prepared by analogous methods.

The isocyanide dichlorides mentioned as starting material are obtained, for example, by the addition of chlorine on to appropriately substituted cycloalkyl-isonitriles.

The 2-cycloalkylamino-oxazolines prepared according to the process described above can also be present in their tautomeric form as 2-cycloalkylimino-oxazolidines of the formula:

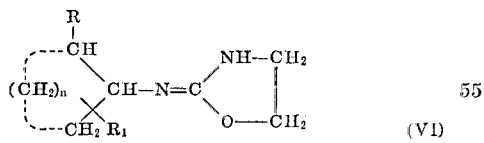

(VI)

wherein R, $R_1$ and $n$ are as previously defined.

The amino or imino group attached to the carbon atom in the 1-position in the cycloalkyl ring can also be in the cis or trans position. The asymmetrical 2-cycloamino-oxazolines and 2-cycloimino-oxazolines exist in racemic form and as is known such racemates can be resolved into their optical isomers.

The pharmacodynamic activity of these different isomers can vary with regard to quality, i.e., the type of activity, and to quantity, i.e., the intensity of activity. Differences with regard to toxicity may also occur. It is therefore, important in producing sterically uniform 2-cycloalkylamino-oxazolines which are alkyl-substituted in the cycloalkyl radical to start from sterically uniform or largely uniform cycloalkylamines which are obtained by known methods, such as fractional distillation, preparative gas chromatography or liquid-liquid distribution, from the mixtures of steric iomers usually resulting from the production of cycloalkylamines. If desired, the sterically uniform cycloalkylamines can subsequently be resolved into the optical isomers by known methods.

The 2-cycloalkylamino-oxazolines are usually bases which crystallize well and can be converted by means of pharmaceutically acceptable inorganic or organic acids into crystalline salts, most of which are readily soluble. Besides hydrochloric acid, weak inorganic or organic acids such as phosphoric acid, acetic acid, lactic acid, fumaric acid, succinic acid and tartaric acid are especially suitable for this purpose.

It should also be appreciated that the 2-cycloalkylamino-oxazolines (I) can exist in isomeric forms some of which are illustrated below. $R_1$ is, for purposes of illustration, defined as one alkyl group.

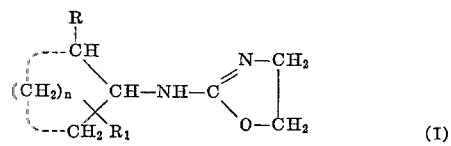

(I)

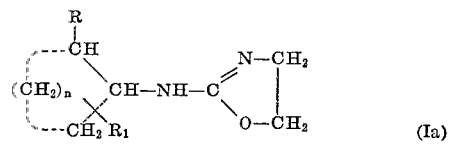

(Ia)

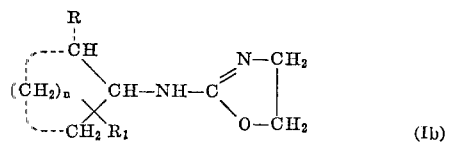

(Ib)

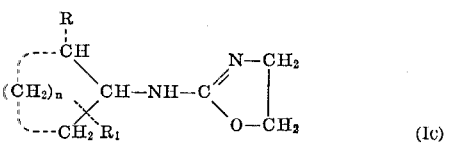

(Ic)

The above 2-cycloalkylamino-oxazolines can also exist in their tautomeric form as 2-cycloalkylimino-oxazolines (VI) in the corresponding isomeric forms:

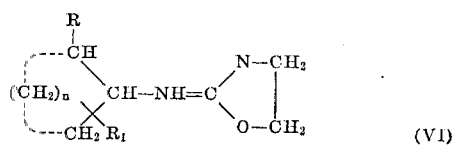

(VI)

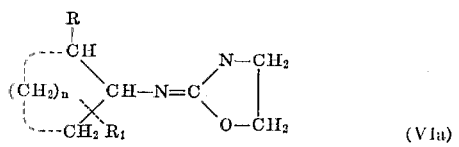

(VIa)

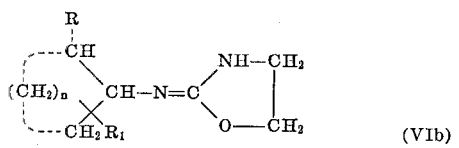

(VIb)

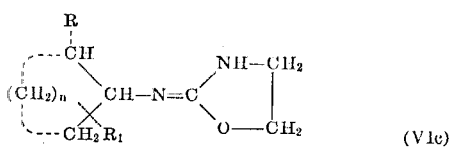

(VIc)

Those compounds of I-I(g) and VI-VI(g) which are asymmetrical exist in racemic form and as is known such racemates can be resolved into their optical isomers.

(A) PRODUCTION OF ISOMERIC 2,6-DIMETHYLCYCLOHEXYLAMINES

Three isomeric 2,6-dimethylcyclohexylamines exist. These have the formulas:

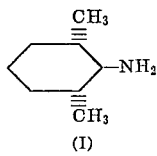 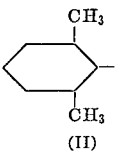 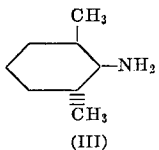
(I) (II) (III)

III, being an unsymmetrical form, is a racemate and can be separated into optical isomers. Each of the isomers may be present as a mixture of two configurations. To isolate the isomers, one starts with 2,6-dimethylcyclohexylamines obtained by catalytic hydrogenation of 2,6-dimethyl-aniline, the composition of which can be determined by gas chromatography. The compound used here contained 44% I, 24% II and 32% III.

The carefully fractioned distillation of the compound over a packed column will supply, after first runnings, a compound of I and II that cannot be separated by further distillation. After an intermediate run containing all three isomers, the pure amine III will change at $Kp_{30}$ (boiling point) 76° C., melting point of the benzoyl compound 150° C. The structure is determined on the basis of the NMR spectrum. The above mentioned compound of I and II is converted with acetone into a compound of the corresponding ketimines, which can be split into its components by means of counter-current distribution in the ligroine/dimethyl sulfoxide/methanol system. The subsequent hydrolysis of the isolated ketimines supplies the bases I, $Kp_{30}$ (boiling point) 70° C., melting point of the benzoyl compound 186° C., and II, $Kp_{30}$ 71° C., melting point of the benzoyl compound 113° C. Here, too, the structure is clear from the NMR spectra.

(B) PRODUCTION OF ISOMERIC 2,6-DIETHYLCYCLOHEXYLAMINES

Three isomers of the formulas:

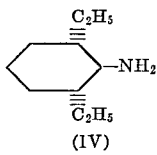 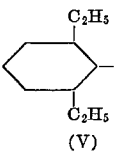 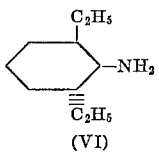
(IV) (V) (VI)

exist. The stereochemistry that has been mentioned under A applies here too. A compound of isomers obtained by catalytic hydrogenation of 2,6-diethylcyclohexylamine and having a composition as determined by gas chromatography of 43% IV, 34% V and 23% VI, is split, as described under A, by fractional distillation, into a compound of IV and V and the pure base VI of $Kp_{30}$ 110.5° C. Melting point of the benzoyl compound of VI: 138° C. Out of the above mentioned compound there can be obtained, through countercurrent distribution in the petroleum ether/methanol/water system, the pure bases IV, $Kp_{30}$ 107° C., melting point of the benzoyl compound 183° C., and V, $Kp_{30}$ 108° C., melting point of the benzoyl compound 62° C. The structure for all three amines is determined from the NMR spectra.

(C) PRODUCTION OF ISOMERIC 2-METHYL-6-ETHYLCYCLOHEXYLAMINES

In contrast with substituted 2,6-dialkylcyclohexylamines described under A and B, 2-methyl-6-ethylcyclohexylamine exists in four stereoisomeric forms VII–X, all of which are present as racemates and can be split into eight optically active isomers.

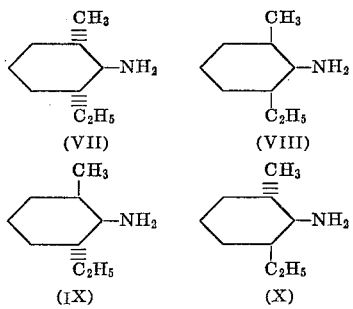

All four forms are formed at the catalystic hydrogenation of 2-methyl-6-ethylaniline. The analysis of such a compound by gas chromatography has yielded the following values: VII: 46%, VIII: 17%, IX: 22%, and X: 15%. By fractional distillation two fractions can be won, representing compounds of VII and VIII, and of IX and X. The first compound can be split through countercurrent distribution in the petroleum ether/methanol/water system into VII and VIII. VII: $Kp_{30}$ 88° C., melting point of the benzoyl compound 182° C.; VIII: $Kp_{30}$ 89° C., melting point of the benzoyl compound 79° C. The second compound of IX and X is converted with acetone into a compound of corresponding ketimines, as described in A, from which it is possible to obtain by fractional distillation one isomer pure, which with hydrolysis will yield IX in stericaly pure form: $Kp_{30}$ 93° C. With the aid of NMR spectra it is possible to determine the structures of VII and VIII, while no clear-cut decision can be made with regard to the third isomer. The isolation of the fourth isomer has thus far not been successful.

(D) PRODUCTION OF ISOMERIC 2,5-DIMETHYLCYCLOHEXYLAMINES 2,5-dimethylcyclohexylamine exists in four stereoisomeric forms XI–XIV, all of which are present as racemates and which can be split into eight optically active isomers.

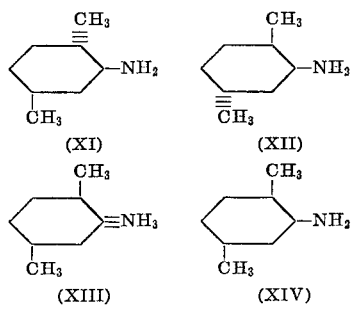

All four forms are formed at the catalytic hydrogenation of 2,5-dimethylaniline. The analysis of such a compound by gas chromatography has yielded the following values:

XI: 22%, XII: 10%, XIII: 37%, XIV: 31%.

Decomposition is successful through distillation and countercurrent distribution.

XI: $Kp_{30}$ 71° C., $n_D^{20}$ 1.4495, melting point of the benzoyl compound 169° C.
XII: $Kp_{30}$ 74° C., $n_D^{20}$ 1.4533, melting point of the benzoyl compound 97° C.
XIII: $Kp_{30}$ 76° C., $n_D^{20}$ 1.4583, melting point of the benzoyl compound 132–133° C.
XIV: $Kp_{30}$ 78° C., $n_D^{20}$ 1.4587, melting point of the benzoyl compound 158° C.

(E) PRODUCTION OF ISOMERIC 2,5-DIMETHYL-CYCLOPENTYLAMINES

What has been stated under A also applies to the stereochemistry of the 2,5-dimethylcyclopentylamines.

(XV) (XVI) (XVII)

2,5-dimethylcyclopentanone oxime, $Kp_{12}$ 96° C., obtained from 2,5-dimethylcyclopentanone (produced according to U.S. Pat. 2,875,249), is hydrogenized catalytically whereby a compound of the three isomeric 2,5-dimethylcyclopentylamines is created. By distillation there are produced in pure form, XV: Kp 130–132° C., and XVII: Kp 141–142° C. Their structures can be determined with the aid of NMR spectra.

(F) PRODUCTION OF ISOMERIC 2,4-DIMETHYL-6-ETHYLCYCLOHEXYLAMINES

Of the eight possible racemic forms of 2,4-dimethyl-6-ethylcyclohexylamine, it has been possible thus far to isolate through distillation and countercurrent distribution the two isomers:

(XVIII) (XIX)

the structures of which can be determined with the aid of the NMR spectra.

XVIII: $Kp_{12}$ 79° C., $n_D^{20}$, 1.4585, melting point of the benzoyl compound 188° C.

XIX: $Kp_{12}$ 79° C., $n_D^{20}$ 1.4588, melting point of the benzoyl compound 51° C.

(G) PRODUCTION OF ISOMERIC 2-ETHYL- AND 2-ISOPROPYLCYCLOHEXYLAMINES

The catalytic hydrogenation of 2-ethyl- and 2-isopropyl-aniline supplies a compound of cis- and trans-2-ethyl- and 2-isopropylcyclohexylamine, respectively.

(XX) (XXI)

(XXII) (XXIII)

The corresponding cis- and trans-isomers can be isolated in pure form through the distillation of their isobutyraldimines.

XX: $n_D^{20}$ 1.4637, melting point of the benzoyl compound 94° C.

XXI: $n_D^{20}$ 1.4613, melting point of the benzoyl compound 156° C.

XXII: $Kp_{28}$ 92° C., $n_D^{20}$ 1.4661, melting point of the benzoyl compound 98° C.

XXIII: $Kp_{28}$ 92.5° C., $n_D^{20}$ 1.4657, melting point of the benzoyl compound 186° C.

The structures can be determined with the aid of the NMR spectra.

(H) PRODUCTION OF ISOMERIC 2-METHYLCYCLOHEPTYLAMINES

For the manufacture of cis- and trans-2-methylcycloheptylamine of the formulas:

(XXIV) (XXV)

2-methylcycloheptanone oxime obtainable from 2-methylcycloheptanone is catalytically hydrogenized. From the amine compound obtained thereby, with $Kp_{12}$ 58–61° C., the pure cis- and trans-2-methylcycloheptylamines can be isolated in pure form through countercurrent distribution.

XXIV: $n_D^{20}$ 1.4712, melting point of the benzoyl compound 109–110° C.

XXV: $n_D^{20}$ 1.4684, melting point of the benzoyl compound 159° C.

The structures were determined with the aid of NMR spectroscopy.

EXAMPLE 1

Into a solution of 50.9 grams of $2^{tr},6^{tr}$-dimethylcyclohexylamine, described under A as amine I, in 150 ml. dry tetrahydrofuran, a solution of 44 grams β-chloroethylisocyanate in 50 ml. dry tetrahydrofuran are dripped under agitation and cooling, at an internal temperature of 0 to 5° C. Thereafter, further agitation continues for 2 hours at room temperature, subsequently it is sucked off the sediment and washed with tetrahydrofuran. There is obtained 48 grams N-β-chloroethyl-N'-($2^{tr},6^{tr}$-dimethylcyclohexyl)-urea with a melting point of 166° C. 35 grams of this urea are finely pulverized and suspended in 500 ml. water. After adding 0.5 ml. Agepon solution (as a wetting agent), it is heated to boiling for 2 hours at the reflux condenser. After the solution obtained thusly is cooled off, small insoluble components are filtered out and the base is separated from the filtrate with ammonia. It is filtered, washed with water and dried in the exsiccator. There are obtained 25 grams of 2-($2^{tr},6^{tr}$-dimethylcyclohexyl)-amino-2-oxazoline of the formula:

which, after resolution, melts out of acetic ester at 153° C. Hydrochloride melting point 170° C.

EXAMPLE 2

50.9 grams of the compound of isomeric 2,6-dimethylcyclohexylamines described under A, obtained through catalytic reduction and having a content of about 44% amine I, are reacted with 44 grams β-chloroethyl-isocyanate, as described in Example 1. Thereby a colorless, crystallized compound is liberated, which is filtered off after settling overnight. Yield: 24.3 grams. On the basis of its melting point of 166° C. and its IR spectrum, it proves to be identical with the N-β-chloroethyl-N'-($2^{tr}$, $6^{tr}$-dimethylcyclohexyl)-urea described in Example 1. By boiling down with water there is obtained, in the method of operation described in Example 1, 17.8 grams of the 2-($2^{tr},6^{tr}$-dimethylcyclohexyl)amino-2-oxazoline with a melting point of 153° C. described in Example 1.

EXAMPLE 3

Into a solution of 42.3 grams of $2^c,6^{tr}$-dimethylcyclohexamine, described as amine III under A, in 150 ml. dry tetrahydrofuran, there is dripped, under agitation and cooling at 0° C., a solution of 33 grams β-chloroethyl-isocyanate in 50 ml. dry tetrahydrofuran. Further agitation continues for 2 hours at room temperature and then the reaction mixture is evaporated in a vacuum, whereby partial crystallization occurs. A sample resulting from resolution out of a mixture of acetic ester-petroleum ether has a melting point of 90–92° C.

The entire residue is suspended in 450 ml. water without additional cleaning and after addition of 0.5 ml. of Agepon-wetting agent the suspension is heated for half an hour at the reflux condenser. After cooling off, the cloudy watery solution is extracted with ether, the watery layer being separated. After expelling the ether still contained in the watery solution, the base is separated with ammonia. It is taken up in ether, the ethereal solution is dried with potassium carbonate and the ether is expelled in the vacuum. There are obtained 31 grams of crystallized 2-(2$^c$,6$^{tr}$-dimethylcyclohexyl)-amino-2-oxazoline of the formula:

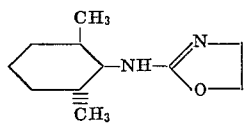

which, after resolution, melts out of petroleum ether at 97 to 99° C. Hydrochloride: melting point 137° C.

EXAMPLE 4

According to the procedure described in Example 3, there is obtained, through transposing of 16.6 grams of the all-cis 2,6-dimethylcyclohexylamine, described as amine II under A, with 14.4 grams β-chloroethyl-isocyanate, 30 grams of a sirupy product which, upon being boiled down in water, yields 16.5 grams of 2-(all-cis-2,6-dimethylcyclohexyl)-amine-2-oxazoline of the formula:

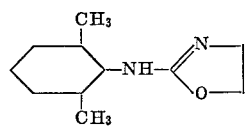

and which, after resolution, melts out of ligroin at 135–137° C. Hydrochloride: melting point 121–123° C.

EXAMPLE 5

In accordance with the process described in Example 1, there is obtained by the reaction of 50 grams of the 2$^{tr}$,6$^{tr}$-diethylcyclohexylamine described under B as amine IV with 32 grams of β-chloroethylisocyanate in 150 ml. of an anhydrous tetrahydrofuran of 40.4 g. of N - β - chloroethyl - N' - (2$^{tr}$,6$^{tr}$ - diethylcyclohexyl) - urea which, after dissolving and recrystallizing from acetic ester, melts at 177–179° C. Eleven g. of this urea are micronized and suspended in 400 ml. of water after the addition of 0.5 ml. of Agepon solution. It is then heated for 4 hours to dryness under cooling reflux and suction filtered after cooling of the small amount of insoluble starting material. From the filtrate there is precipitated the base with ammonia and 7.3 g. of 2-(2$^{tr}$, 6$^{tr}$-diethylcyclohexyl)-amino-2-oxazoline of the formula:

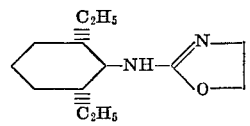

which, after dissolving and recrystallizing from ligroin, melts at 140–141° C.

EXAMPLE 6

38.7 grams of the 2$^c$,6$^{tr}$-diethylcyclohexylamine, described as amine VI under B, is reacted, according to the method of operation described in Example 3, with 27.4 grams β-chloroethyl-isocyanate in dry tetrahydrofuran into a sirupy urea, which is suspended in 400 ml. water. Boiling down (evaporation) lasting one hour yields 36.6 grams of 2-(2$^c$,6$^{tr}$-diethylcyclohexyl)-amino-2-oxazoline of the formula:

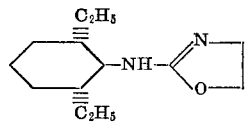

which, after resolution, will melt out of a little petroleum ether at 84–86° C. Acid fumarate: melting point 218–220° C.

EXAMPLE 7

From 21 grams of the all-cis-2,6-diethylcyclohexylamine, described as amine V under B, and 16 grams of β-chloroethyl-isocyanate there is obtained, according to the procedure described in Example 3, a sirupy urea which, upon being boiled down with 300 ml. water, yields 12 grams of 2-(all-cis-2,6-diethylcyclohexyl)-amino-2-oxazoline of the formula:

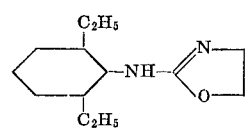

Melting point, after resolution, out of petroleum ether: 128–130° C.

EXAMPLE 8

According to the method of procedure described in Example 3, there are obtained by reacting 23.4 grams of cis-2-methylcyclohexylamine with 22.7 grams of β-chloroethyl-isocyanate in dry tetrahydrofuran, 38 grams of a sirupy product which, upon boiling down with water, yields 24.6 grams of 2-(cis-2-methylcyclohexyl)-amino-2-oxazoline with a melting point of 86–88° C. (after resolution out of a little bit of acetic ester). Acid fumarate: melting point 154–155° C.

EXAMPLE 9

In the same manner as described in Example 8, there are obtained from 33.9 grams trans-2-methylcyclohexylamine and 33 grams β-chloroethyl-isocyanate, 52.2 grams of a crystallized urea (melting point 106–108° C.). 26 grams of this product yield, upon boiling down with 260 ml. water, 17.5 grams 2-(trans-2-methylcyclohexyl)-amino-2-oxazoline with a melting point of 142° C. Fumarate: melting point 205–207° C.

EXAMPLE 10

According to the method of operation as described in Example 5, there is obtained from 25.4 grams of 2$^{tr}$-methyl-6$^{tr}$-ethylcyclohexylamine, described as amine VII under C, and 19.7 grams of β-chloroethyl-isocyanate, 31.5 grams of N-β-chloroethyl-N'-(2$^{tr}$-methyl-6$^{tr}$-ethylcyclohexyl)-urea with a melting point of 146–148° C., which upon boiling down with water will yield 20.4 grams 2-(2$^{tr}$ - methyl-6$^{tr}$-ethylcyclohexyl)-amino-2-oxazoline of the formula:

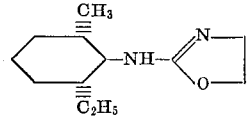

with a melting point of 130–131° C. Hydrochloride melting point: 111–113° C. Fumarate: melting point 205–207° C.

EXAMPLE 11

According to the procedure described in Example 3, there is obtained from 14.1 grams of all-cis-2-methyl-6-ethylcyclohexylamine, described as amine VIII under C, and 11 grams of β-chloroethyl-isocyanate, 24.9 grams of a sirupy product which, upon being boiled down with water, yields 12.5 grams of 2-(all-cis-2-methyl-6-ethyl-cyclohexyl)-amino-2-oxazoline of the formula:

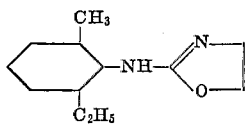

which, after resolution, melts out of petroleum ether at 104–105° C. Acid fumarate, melting point 204–206° C.

EXAMPLE 12

According to the procedure described in Example 3, there is obtained out of 3.8 grams of a sterically uniform amine, which, according to C, has one of the two formulas:

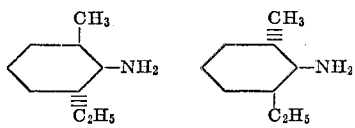

and 3 grams of β-chloroethyl-isocyanate, 6.6 of a sirupy product which, upon being boiled down with water, yields 3.7 grams of a crystallized 2-(2-methyl-6-ethylcyclohexyl)-amino-2-oxazoline with a melting point of 71–73° C., which must have one of the two following formulas:

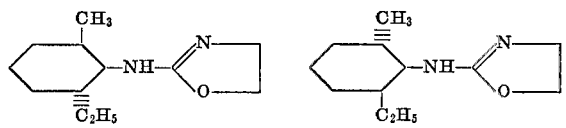

Hydrochloride, melting point 103–105° C.

EXAMPLE 13

According to the procedure described in Example 5, there is obtained, by reacting 41.2 grams of the compound of isomeric 2-methyl-6-ethylcyclohexylamines with a content of about 47% amine VII as described under C and obtained through catalytic hydrogenation of 2-methyl-6-ethylcyclohexylamine, with 32.1 grams β-chloroethyl-isocyanate, 30.6 grams of a urea with a melting point of 146–148° C. The melting point of the mixture and the IR spectrum prove that it is identical with the N-β-chloroethyl-N'-2-(2$^{tr}$-methyl-6$^{tr}$-ethylcyclohexyl)-urea described in Example 10. Boiling down with water yields 21.4 grams of 2 - (2$^{tr}$-methyl-6$^{tr}$-ethylcyclohexyl)-amino-2-oxazoline with a melting point of 130–131° C., as described in Example 10.

EXAMPLE 14

According to the process described in Example 1 there is obtained, by reacting 18.0 grams of 2$^{tr}$,5$^c$-dimethylcyclohexylamine, described as amine XI under D, with 15.0 grams of β-chloroethyl-isocyanate in 70 ml. tetrahydrofuran, 19.0 grams N-(β-chloroethyl)-N'-(2$^{tr}$,5$^c$-dimethylcyclohexyl)-urea which, upon being boiled down in water will yield 13.3 grams 2-(2$^{tr}$,5$^c$-dimethylcyclohexyl)-amino-2-oxazoline of the formula:

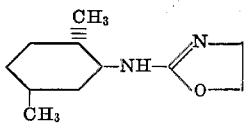

with a melting point of 108–109° C. Hydrochloride melting point 118–121° C.

EXAMPLE 15

31.7 grams of 2$^c$,5$^{tr}$-dimethylcyclohexylamine, described as amine XII under D, are reacted according to the procedure described in Example 3, with 27.5 grams β-chloroethyl-isocyanate, into 55 grams of a sirupy urea which, upon being boiled down with 400 ml. water, yields 31 grams of 2-(2$^c$,5$^{tr}$-dimethylcyclohexyl)-amino-2-oxazoline of the formula:

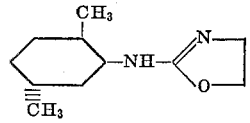

which, after resolution, melts out of petroleum ether at 107–110° C. Hydrochloride melting point 134–136° C.

EXAMPLE 16

68.9 grams of 2$^{tr}$,5$^{tr}$-dimethylcyclohexylamine, described as amine XIII in D, are reacted according to the procedure described in Example 1, with 59.5 grams β-chloroethyl-isocyanate, into 107 grams N-(β-chloroethyl)-N'-(2$^{tr}$,5$^{tr}$-dimethylcyclohexyl)-urea which, after resolution, melts out of an acetic ester/petroleum ether mixture at 84–86° C. 23.2 grams of this urea yield, upon boiling down with 200 ml. water, 15.3 grams of 2-(2$^{tr}$,5$^{tr}$-dimethylcyclohexyl)-amino-2-oxazoline of the formula:

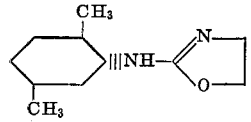

which, upon resolution, melts out of ligroin at 125–127° C.

EXAMPLE 17

41.6 grams of all-cis-2,5-dimethylcyclohexylamine, described under D as amine XIV, yield, according to the method of operation described in Example 1, with 32.8 grams β-chloroethyl-isocyanate, 62.3 grams N-(β-chloroethyl)-N'-(all-cis - 2,5 - dimethylcyclohexyl)-urea of a melting point of 106–108° C. (after resolution out of acetic ester/pertoleum ether), which is boiled down in 600 ml. water to 38 grams 2-(all-cis-2,5-dimethylcyclohexyl)-amino-2-oxazoline of the formula:

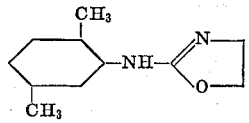

Melting point 122–124° C. (after resolution out of ligroin).

EXAMPLE 18

25.5 grams 2,2-dimethylcyclohexylamine are reacted with 22 grams β-chloroethyl-isocyanate in 200 ml. tetrahydrofuran with ice-cooling. Agitating continues for 2 hours whereupon it is compressed in the vacuum and the remaining N - (β - chloroethyl)-N'-(2,2-dimethylcyclohexyl)-urea is cyclized through heating with 250 ml. water for one hour to yield 2-(2,2-dimethylcyclohexyl)-amino-2-oxazoline with melting point of 126–127° C. (after resolution from acetic ester). Yield 18.8 grams.

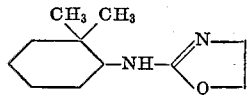

2,2-dimethylcyclohexylamine (Kp$_{90}$ 94° C.) is obtained through catalytic hydrogenation of 2,2-dimethylcyclohexanone-oxime (melting point 89.5–90.5° C.).

EXAMPLE 19

According to the procedure described in Example 3 there is obtained through reacting 12 grams of 2$^{tr}$,5$^{tr}$-dimethylcyclopentylamine, described as amine XV under E, with 11.2 grams β-chloroethyl-isocyanate, 12 grams N-(β - chloroethyl)-N'-(2$^{tr}$,5$^{tr}$-dimethylcyclophentyl)-urea with a melting point of 116–118° C., which upon boiling down with water yields 8.2 grams 2-(2tr,5tr-dimethyl-cyclopentyl)-amino-2-oxazoline of the formula:

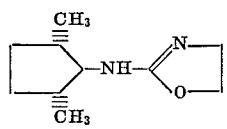

having a melting point of 127–128° C. (out of petroleum ether).

EXAMPLE 20

According to the procedure described in Example 3 there is obtained, by the reaction of 22.4 grams 2c,5tr-dimethylcyclophenylamine, described as amine XVII under E, with 22.2 grams β-chloroethyl-isocyanate, 24.5 grams (N-(β-chloroethyl) - N' - (2c,5tr-dimethylcyclopentyl)-urea of a melting point of 78–80° C., which upon boiling down with water yields 15.2 grams of 2-(2c,5tr-dimethylcyclopentyl)-amino-2-oxazoline of the formula:

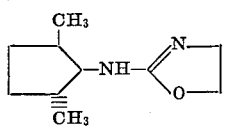

with a melting point of 102–103° C. (out of petroleum ether).

EXAMPLE 21

According to the procedure described in Example 3, there is obtained, through reacting of 20.2 grams of 2tr,4tr-dimethyl-6tr-ethylcyclohexylamine, described as amine XVIII under F, with 14.3 grams β-chloroethyl-urea, 27.5 g. N - (β-chloroethyl)-N'-(2tr,4tr-dimethyl-6tr-ethylcyclohexyl-urea, with a melting point of 169–171° C. (out of acetic ester/petroleum ether) which, upon being boiled down with water, yields 16.4 grams 2-(2tr,4tr-dimethyl-6tr-ethylcyclohexyl)-amino-2-oxazoline of the formula:

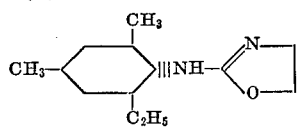

with a melting point of 126–128° C.

EXAMPLE 22

According to the procedure described in Example 3 there is obtained, by reacting 10.5 grams all-cis-2,4-dimethyl-6-ethyl-cyclohexylamine, described as amine XIX under E, with 7.5 grams β-chloroethyl-isocyanate, 15.9 grams of sirupy N-(β-chloroethyl)-N'-(all-cis-2,4-dimethyl-6-ethylcyclohexyl)-urea, which, upon being boiled in water yields 9.5 grams of 2-(all-cis-2,4-dimethyl-6-ethyl-cyclohexyl)-amino-2-oxazoline of the formula:

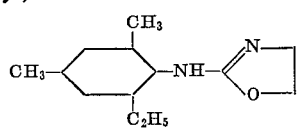

with a melting point of 108–109° C.

EXAMPLE 23

According to the procedure described in Example 3, there is obtained, by the reaction of 25.4 grams of cis-2-ethylcyclohexylamine, described as amine XX under C, with 22 grams β-chloroethyl-isocyanate, 30.1 grams of sirupy N-(β-chloroethyl) - N' - (cis-2-ethylcyclohexyl)-urea which, upon boiling down with water yields 27.5 grams of 2-(cis-2-ethylcyclohexyl)-amino-2-oxazoline of the formula:

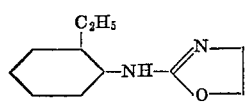

with a melting point of 79–82° C.

EXAMPLE 24

According to the procedure described in Example 3, there is obtained, by the reaction of 25.4 grams of trans-2-ethylcyclohexylamine, described as amine XXI under G, with 22 grams β-chloroethyl-isocyanate, 35.5 grams N-(β - chloroethyl)-N'-trans-2-ethylcyclohexyl)-urea with a melting point of 111–113° C. which, upon boiling down with water, yields 23.6 grams of 2-(trans-2-ethylcyclohexyl)-amino-2-oxazoline of the formula:

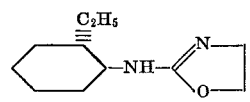

with a melting point of 105–106° C.

EXAMPLE 25

According to the procedure described in Example 3, there is obtained, by reacting 28.1 grams of cis-2-isopropylcyclohexylamine, described as amine XXII in G, with 22 grams β - chloroethyl-isocyanate, 55 grams of sirupy N-(β-chloroethyl)-N'-(cis-2-isopropylcyclohexyl)-urea which, upon boiling down with water, yields 33 grams 2-(cis-2-isopropylcylohexyl)-amino - 2 - oxazoline of the formula:

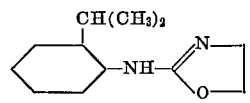

with a melting point of 98–100° C.

EXAMPLE 26

According to the procedure described in Example 3, there is obtained by reacting 28.1 grams of trans-2-isopropylcyclohexylamine, described as amine XXIII in G, with 22 grams β-chloroethyl-isocyanate, 40 grams N-(β-chloroethyl)-N'-(trans-2-isopropylcyclohexyl) - urea with a melting point of 98–100° C. (out of acetic ester/petroleum ether), which, upon boiling down with water yields 20 grams 2 - (trans - 2 - isopropylcyclohexyl)-amino-2-oxazoline of the formula:

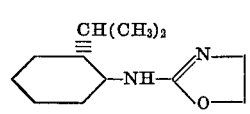

with a melting point of 108–110° C.

EXAMPLE 27

According to the procedure described in Example 3, there is obtained, by reacting 2.3 grams of cis-2-methyl-cycloheptylamine, described in H as amine XXIV, with 2.1 grams of β-chloroethyl-isocyanate, 4.2 grams of sirupy N-(β-chloroethyl)-N'-(cis - 2 - methylcycloheptyl)-urea which, upon boiling down with water, yields 2.5 grams of 2-(cis-2-methylcycloheptyl)-amino - 2 - oxazoline of the formula:

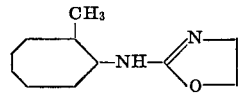

with a melting point of 84.5–85.5° C. (out of petroleum ether).

EXAMPLE 28

According to the procedure described in Example 3, there is obtained, by the reaction of 3.95 g. of trans-2-methylcycloheptylamine, described under H as amine XXV, with 3.6 grams β-chloroethyl-isocyanate, 7.4 grams of sirupy N-(β-chloroethyl)-N'-(trans - 2 - methylcycloheptyl)-urea which, upon boiling down with water, yields 5.1 grams of 2-(trans - 2 - methylcycloheptyl)-amino-2-oxazoline of the formula:

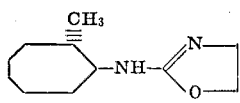

with a melting point of 101–102° C. (out of petroleum ether).

What is claimed is:
1. A compound selected from the group consisting of

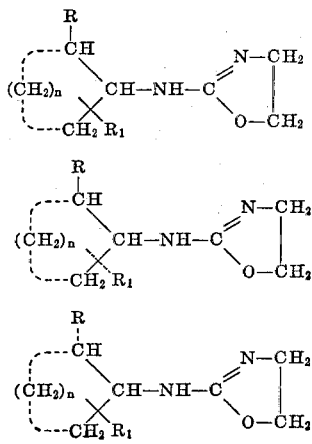

and

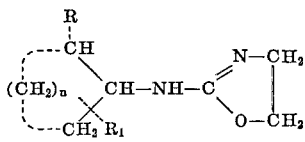

wherein:

R is lower alkyl of 1 to 3 carbon atoms,
R₁ is hydrogen or one or two lower alkyl moieties of 1 to 5 carbon atoms,
n is an integer from 2 to 4, and salts and bases thereof, and the —NH— or —N= moiety is cis or trans to the carbon atom in the 1-position of the cycloalkyl moiety and optical isomers of those compounds having an asymmetrical carbon atom.

2. A compound selected from the group consisting of

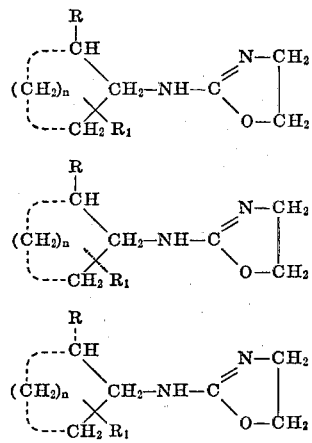

and

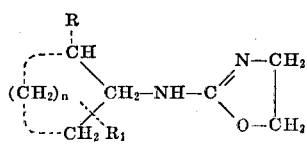

wherein:

R is lower alkyl of 1 to 3 carbon atoms,
R₁ is hydrogen or one or two lower alkyl moieties of 1 to 5 carbon atoms,
n is an integer from 2 to 4, and salts and bases thereof, and the —NH— moiety is cis or trans to the carbon atom in the 1-position of the cycloalkyl moiety and optical isomers of those compounds having an asymmetrical carbon atoms.

3. 2-cycloalkylamino-oxazolines according to claim 1 of the formula:

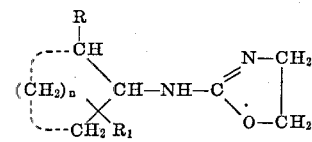

wherein:

R is lower alkyl of 1 to 3 carbon atoms,
R₁ is hydrogen or 1 or 2 lower alkyl moieties of 1 to 5 carbon atoms,
n is an integer from 2 to 4, and
R and R₁ are all cis, all trans or some are cis and the remainder are trans.

4. The compound according to claim 1 which is 2-(2$^{tr}$,6$^{tr}$-dimethylcyclohexyl)-amino-2-oxazoline.

5. The compound according to claim 1 which is 2-(2$^{c}$,6$^{tr}$-dimethylcyclohexyl)-amino-2-oxazoline.

6. The compound according to claim 1 which is 2-(all cis-2,6-dimethylcyclohexyl)-amino-2-oxazoline.

7. The compound according to claim 1 which is 2-(2$^{tr}$,6$^{tr}$-diethylcyclohexyl-amino-2-oxazoline.

8. The compound according to claim 1 which is 2-2$^{c}$,6$^{tr}$-diethylcyclohexyl)-amino-2-oxaline.

9. The compound according to claim 1 which is 2-(all-cis-2,6-diethylcyclohexyl)-amino-2-oxazoline.

10. The compound according to claim 1 which is 2-(cis-2-methylcyclohexyl)-amino-2-oxazoline.

11. The compound according to claim 1 which is 2-(trans-2-methylcyclohexyl)-amino-2-oxazoline.

12. The compound according to claim 1 which is 2-(2$^{tr}$-methyl-6$^{tr}$-ethylcyclohexyl)-amino-2-oxazoline.

13. The compound according to claim 1 which is 2-(all-cis-2-methyl-6-ethylcyclohexyl)-amino-2-oxazoline.

14. The compound according to claim 1 which is 2-(2$^{c}$-methyl-6$^{tr}$-ethylcyclohexyl)-amino-2-oxazoline.

15. The compound according to claim 1 which is 2-(2$^{tr}$-methyl-6$^{c}$-ethylcyclohexyl)-amino–oxazoline.

16. The compound according to claim 1 which is 2-(2$^{tr}$,5$^{c}$-dimethylcyclohexyl)-amino-2-oxazoline.

17. The compound according to claim 1 which is 2-(2$^{c}$,5$^{tr}$-dimethylcyclohexyl)-amino-2-oxazoline.

18. The compound according to claim 1 which is 2-(2$^{tr}$,5$^{tr}$-dimethylcyclohexyl)-amino-2-oxazoline.

19. The compound according to claim 1 which is 2-(all-cis-2,5-dimethylcyclohexyl)-amino-2-oxazoline.

20. The compound according to claim 1 which is 2-(2,2-dimethylcyclohexyl)-amino-2-oxazoline.

21. The compound according to claim 1 which is 2-(2$^{tr}$, 5$^{tr}$-dimethylcyclopentyl)-amino-2-oxazoline.

22. The compound according to claim 1 which is 2-(2$^{c}$,5$^{tr}$-dimethylcyclopentyl)-amino-2-oxazoline.

23. The compound according to claim 1 which is 2-(2$^{tr}$,4$^{tr}$-dimethyl-6$^{tr}$-ethylcyclohexyl)-amino-2-oxazoline.

24. The compound according to claim 1 which is 2-(all-cis-2,4 - dimethyl-6-ethylcyclohexyl) - amino-2-oxazoline.

25. The compound according to claim 1 which is 2-(cis-2-ethylcyclohexyl)-amino-2-oxazoline.

26. The compound according to claim 1 which is 2-(trans-2-ethylcyclohexyl)-amino-2-oxazoline.

27. The compound according to claim 1 which is 2-(cis-2-isopropylcyclohexyl)-amino-2-oxazoline.

28. The compound according to claim 1 which is 2-(trans-2-isopropylcyclohexyl)-amino-2-oxazoline.

29. The compound according to claim 1 which is 2-(cis-2-methylcycloheptyl)-amino-2-oxazoline.

30. The compound according to claim 1 which is 2-(trans-2-methylcycloheptyl)-amino-2-oxazoline.

References Cited

FOREIGN PATENTS

| | | | |
|---|---|---|---|
| 245,816 | 1/1960 | Australia | 260—307 |
| 632,578 | 11/1963 | Belgium | 260—307 |

ALTON D. ROLLINS, Primary Examiner

U.S. Cl. X.R.

260—456, 464, 553, 558, 563, 566; 424—272